(12) United States Patent
Sur et al.

(10) Patent No.: US 11,645,534 B2
(45) Date of Patent: May 9, 2023

(54) TRIGGERED OPERATIONS TO IMPROVE ALLREDUCE OVERLAP

(71) Applicant: Intel Corporation, Santa Clara, CA (US)

(72) Inventors: Sayantan Sur, Portland, OR (US); James Dinan, Hudson, MA (US); Maria Garzaran, Champaign, IL (US); Anupama Kurpad, Portland, OR (US); Andrew Friedley, Livermore, CA (US); Nusrat Islam, Bee Cave, TX (US); Robert Zak, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 1244 days.

(21) Appl. No.: 16/127,416

(22) Filed: Sep. 11, 2018

(65) Prior Publication Data
US 2019/0042946 A1 Feb. 7, 2019

(51) Int. Cl.
*G06N 3/08* (2006.01)
*G06N 3/063* (2006.01)
*G06N 3/04* (2006.01)
*G06N 3/084* (2023.01)

(52) U.S. Cl.
CPC ............. *G06N 3/084* (2013.01); *G06N 3/04* (2013.01); *G06N 3/063* (2013.01)

(58) Field of Classification Search
CPC ........... G06N 3/084; G06N 3/04; G06N 3/063
See application file for complete search history.

(56) References Cited

U.S. PATENT DOCUMENTS

| | | | | |
|---|---|---|---|---|
| 2012/0166374 | A1* | 6/2012 | Moussa | G06N 3/084 706/30 |
| 2018/0032911 | A1* | 2/2018 | Yamazaki | G06T 1/60 |
| 2019/0312772 | A1* | 10/2019 | Zhao | H04L 41/12 |
| 2019/0391850 | A1* | 12/2019 | Malaya | G06F 9/5044 |
| 2021/0357760 | A1* | 11/2021 | Tanaka | G06N 3/10 |

OTHER PUBLICATIONS

Renggli et al., SPARCML: High-Performance Sparse Communication for Machine Learning, Feb. 22, 2018, arXiv, v1 (Year: 2018).*
Mamidala, "Efficient Embedding of MPI Collectives in MXNET DAGs for scaling Deep Learning", Feb. 20, 2018, arXiv, <https://arxiv.org/abs/1802.06949> (Year: 2018).*
Teng Xiao, Zhengyu Chen, Donglin Wang, and Suhang Wang. 2021. Learning How to Propagate Messages in Graph Neural Networks. In Proceedings of the 27th ACM SIGKDD Conference on Knowledge Discovery & Data Mining (KDD '21). Association for Computing Machinery, New York, NY, USA, 1894-1903. (Year: 2021).*

(Continued)

*Primary Examiner* — James D. Rutten
(74) *Attorney, Agent, or Firm* — Jordan IP Law, LLC

(57) ABSTRACT

An embodiment of a semiconductor package apparatus may include technology to embed one or more trigger operations in one or more messages related to collective operations for a neural network, and issue the one or more messages related to the collective operations to a hardware-based message scheduler in a desired order of execution. Other embodiments are disclosed and claimed.

21 Claims, 11 Drawing Sheets

(56) References Cited

OTHER PUBLICATIONS

K. D. Underwood et al., "Enabling Flexible Collective Communication Offload with Triggered Operations," 2011 IEEE 19th Annual Symposium on High Performance Interconnects, 2011, pp. 35-42, doi: 10.1109/HOTI.2011.15. (Year: 2011).*
Kurth et al., "Deep Learning at 15PF: Supervised and Semi-Supervised Classification for Scientific Data", arxiv.org/pdf/1708.05256.pdf, Aug. 17, 2017, 12 pages.
Sridharan et al., "On Scale-Out Deep Learning Training for Cloud and HPC", arxiv.org/pdf/1801.08030.pdf, Jan. 24, 2018, 3 pages.
cDAG, "A Framework for the Runtime Detection and Optimization of Collective Communication Patterns", htor.inf.ethz.ch/research/cDAG, Retrieved on Jul. 25, 2018, 3 pages.
Hemmert et al., "Using Triggered Operations to Offload Collective Communication Operations", researchgate.net/publication/225223713_Using_Triggered_Operations_to_Offload_Collective_Communication_Operations, Sep. 2010, 9 pages.

\* cited by examiner

Phase 1

Phase 2

80→

| Layer | Compute Time | Triggered Operations |
|---|---|---|
| L3 | ∞ | Op0 (Th1,C3) Op1 (Th2, C3), ... |
| L2 | ∞ | Op0 (Th1,C2) Op1 (Th2, C2), ... |
| L1 | ∞ | Op0 (Th1,C1) Op1 (Th2, C1), ... |
| L0 | ∞ | Op0 (Th1,C0) Op1 (Th2, C0), ... |

| Layer | Compute Time | Triggered Operations |
|---|---|---|
| L3 | T3 | Op0 (Th1,C3) Op1 (Th2+1, C3), ... |
| L2 | T2 | Op0 (Th1,C2) Op1 (Th2+1, C2), ... TCTInc(C3, 1) |
| L1 | T1 | Op0 (Th1,C1) Op1 (Th2+1, C1), ..., TCTInc(C2, 1) |
| L0 | T0 | Op0 (Th1,C0) Op1 (Th2, C0), ..., TCTInc(C1, 1) |

FIG. 8B

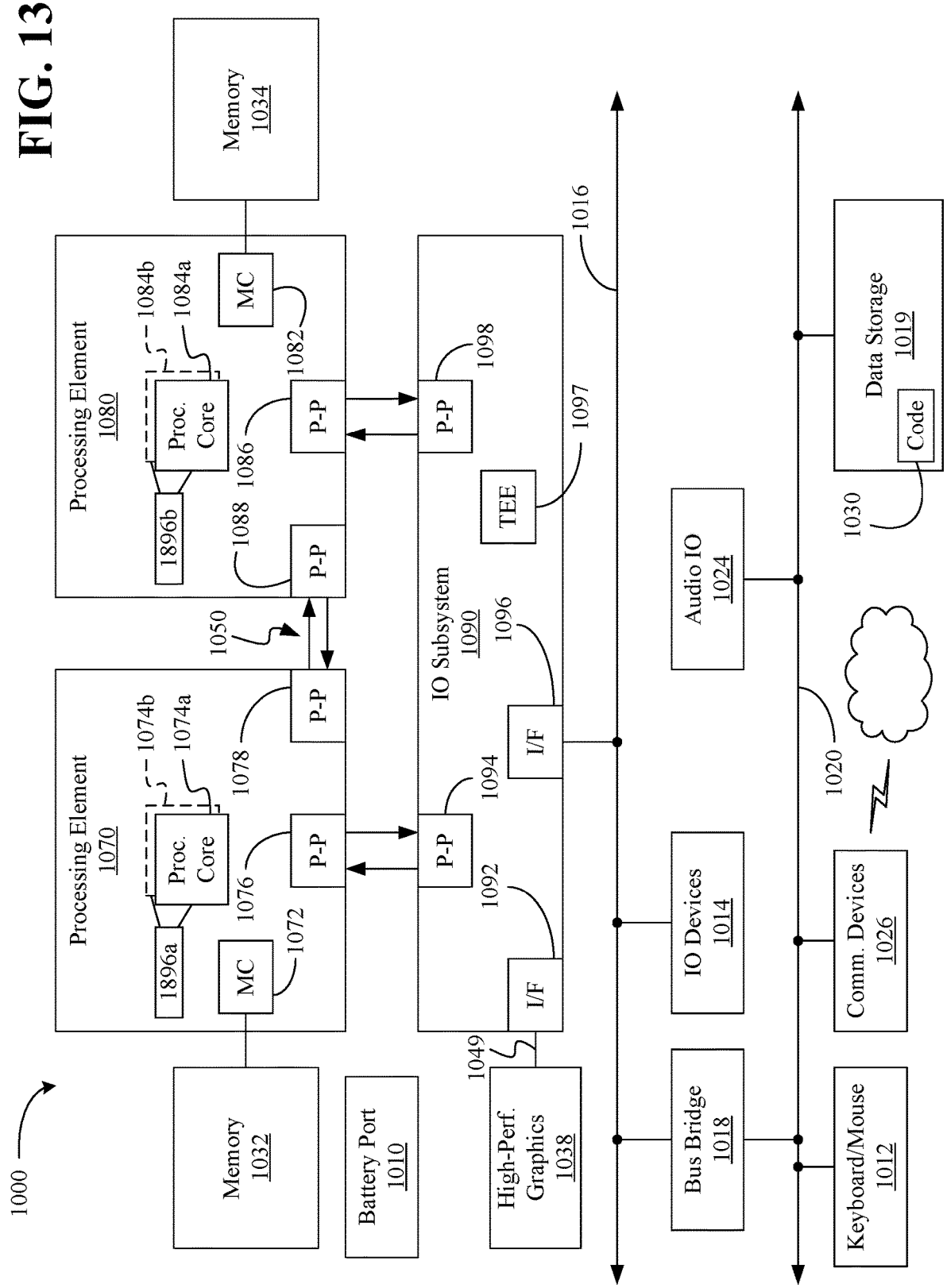

TRIGGERED OPERATIONS TO IMPROVE ALLREDUCE OVERLAP

TECHNICAL FIELD

Embodiments generally relate to machine learning systems. More particularly, embodiments relate to triggered operations to improve allreduce overlap.

BACKGROUND

Multi-layer neural network technology has many applications, include machine learning applications. Examples of machine learning applications include CAFFE, THEANO, MXNET, TENSORFLOW, PYTORCH, PADDLE PADDLE and MICROSOFT CNTK, all of which may utilize multi-layer neural network technology. Deep learning may refer to machine learning technology that utilizes a cascade of multiple layers. In general, a layer may also take the output of from other previous layers or from subsequent layers (e.g., recurrent neural networks) as input.

BRIEF DESCRIPTION OF THE DRAWINGS

The various advantages of the embodiments will become apparent to one skilled in the art by reading the following specification and appended claims, and by referencing the following drawings, in which:

FIGS. 8A to 8B are illustrative diagram of an example of a communication schedule table according to an embodiment;

FIG. 13 is a block diagram of an example of a system according to an embodiment.

DESCRIPTION OF EMBODIMENTS

Figure 1:
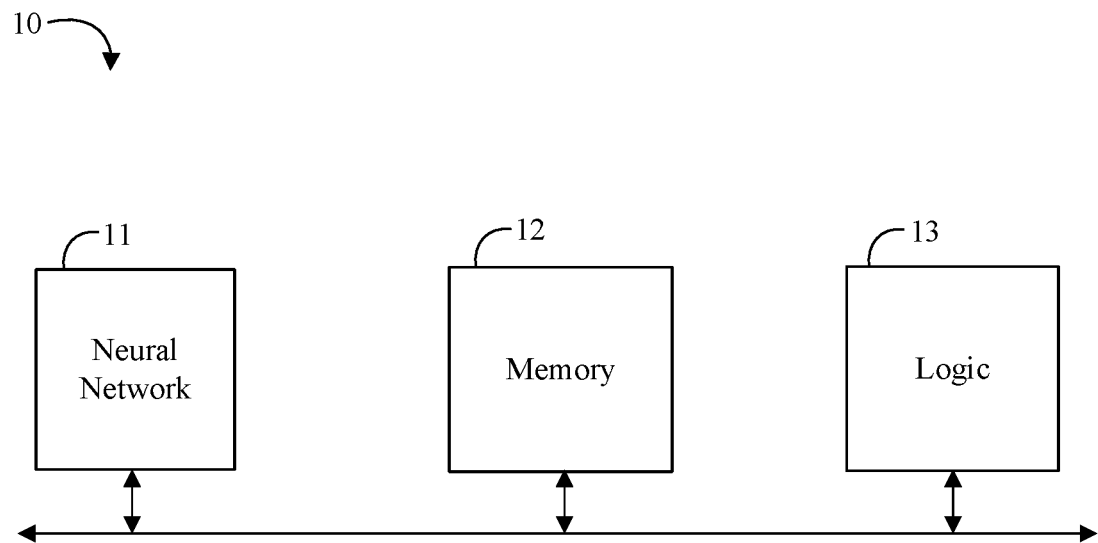
FIG. 1 is a block diagram of an example of a machine learning system according to an embodiment.

Turning now to FIG. 1, an embodiment of a machine learning system 10 may include a neural network 11, memory 12 communicatively coupled to the neural network 11, and logic 13 communicatively coupled to the neural network 11 to embed one or more trigger operations in one or more messages related to collective operations for the neural network 11, and issue the one or more messages related to the collective operations to a hardware-based message scheduler in a desired order of execution. In some embodiments, the logic 13 may be further configured to construct a directed acyclic graph (DAG) corresponding to the collective operations for the neural network 11, and offload execution of the DAG to the hardware-based message scheduler. In some embodiments, the logic 13 may be further configured to organize a set of collective operations for gradient exchange based on all layers of the neural network 11. For example, the logic 13 may be configured to overlap messages for a current layer of the neural network 11 with messages of one or more prior layers of the neural network 11 in a backward propagation phase. Additionally, or alternatively, the logic 13 may be configured to issue messages for a subsequent iteration of collective operations based on information corresponding to a previous iteration of collective operations. In any of the embodiments herein, the neural network 11 may include a deep learning (DL) neural network. In some embodiments, the neural network 11, the memory 12, and/or the logic 13 may be located in, or co-located with, various components, including a processor (e.g., on a same die).

Embodiments of each of the above neural network 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of a suitable processor may include a general purpose processor, a special purpose processor, a central processor unit (CPU), a graphics processor unit (GPU), a kernel, and execution unit, a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by a processor cause the system 10 to implement one or more components, features, or aspects of the system 10 (e.g., the neural network 11, the logic 13, embedding one or more trigger operations in the one or more messages related to collective operations for the neural network, issuing the one or more messages related to the collective operations to a hardware-based message scheduler in the desired order of execution, etc.).

Figure 2:
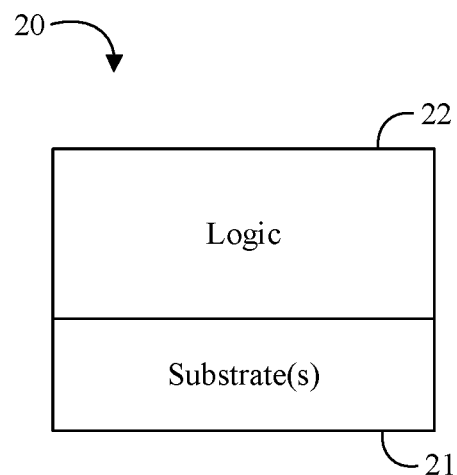
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to embed one or more trigger operations in one or more messages related to collective operations for a neural network, and issue the one or more messages related to the collective operations to a hardware-based message scheduler in a desired order of execution. In some embodiments, the logic 22 may be configured to construct a DAG corresponding to the collective operations for the neural network, and offload execution of the DAG to the hardware-based message scheduler. In some embodiments, the logic 22 may be further configured to organize a set of collective operations for gradient exchange based on all layers of the neural network. For example, the logic 22 may be configured to overlap messages for a current layer of the neural network with messages of one or more prior layers of the neural network in a backward propagation phase. Additionally, or alternatively, the logic 22 may be configured to issue messages for a subsequent iteration of collective operations based on information corresponding to a previous iteration of collective operations. In any of the embodiments herein, the neural network may include a DL neural network. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIG. 3), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3:
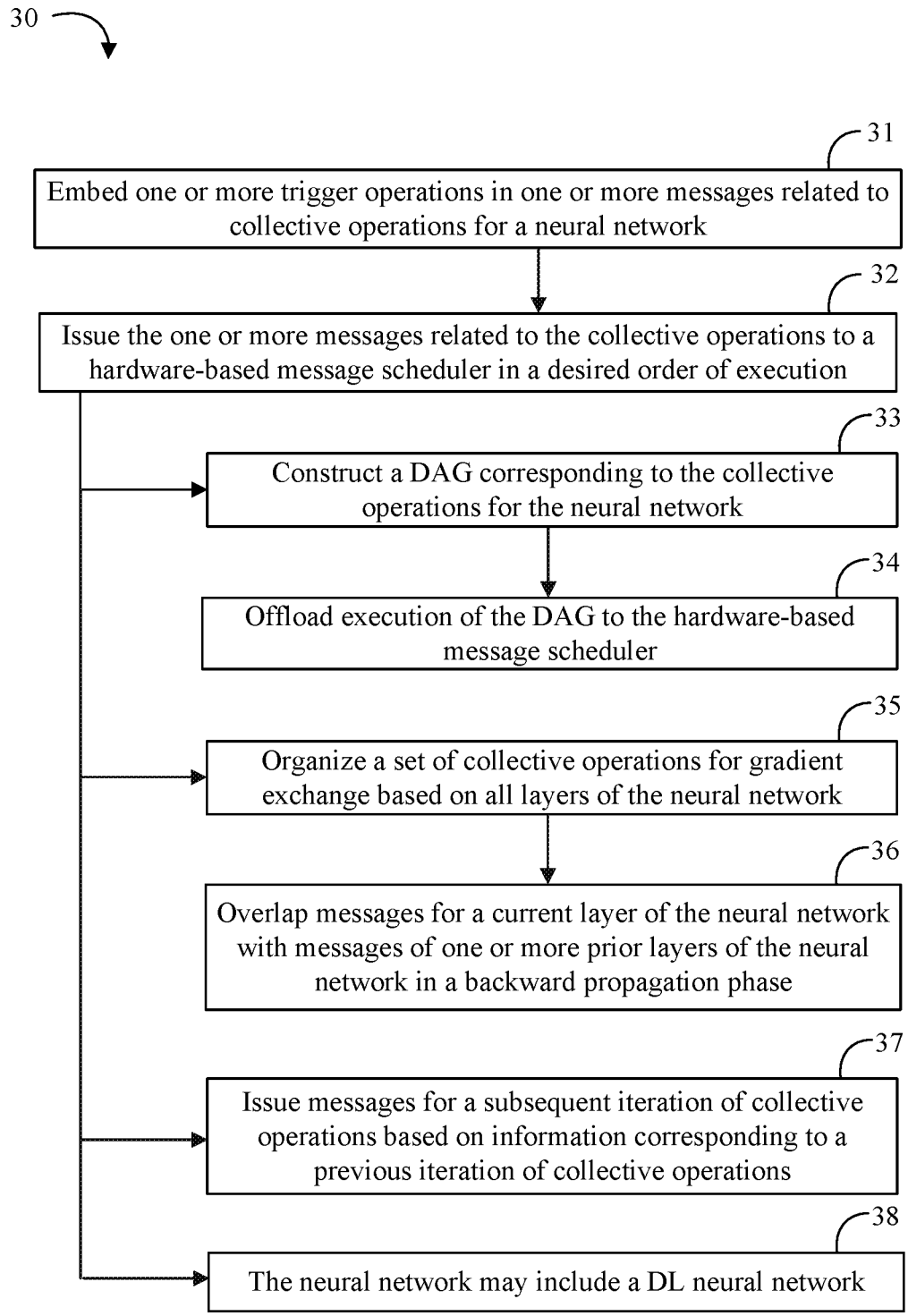
FIG. 3 is a flowchart of an example of a method of machine learning according to an embodiment.

Turning now to FIG. 3, an embodiment of a method 30 of machine learning may include embedding one or more trigger operations in one or more messages related to collective operations for a neural network at block 31, and issuing the one or more messages related to the collective operations to a hardware-based message scheduler in a desired order of execution at block 32. Some embodiments of the method 30 may include constructing a DAG corresponding to the collective operations for the neural network at block 33, and offloading execution of the DAG to the hardware-based message scheduler at block 34. Some embodiments of the method 30 may include organizing a set of collective operations for gradient exchange based on all layers of the neural network at block 35. For example, the method 30 may include overlapping messages for a current layer of the neural network with messages of one or more prior layers of the neural network in a backward propagation phase at block 36. Some embodiments of the method 30 may further include issuing messages for a subsequent iteration of collective operations based on information corresponding to a previous iteration of collective operations at block 37. In any of the embodiments herein, the neural network may include a DL neural network at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
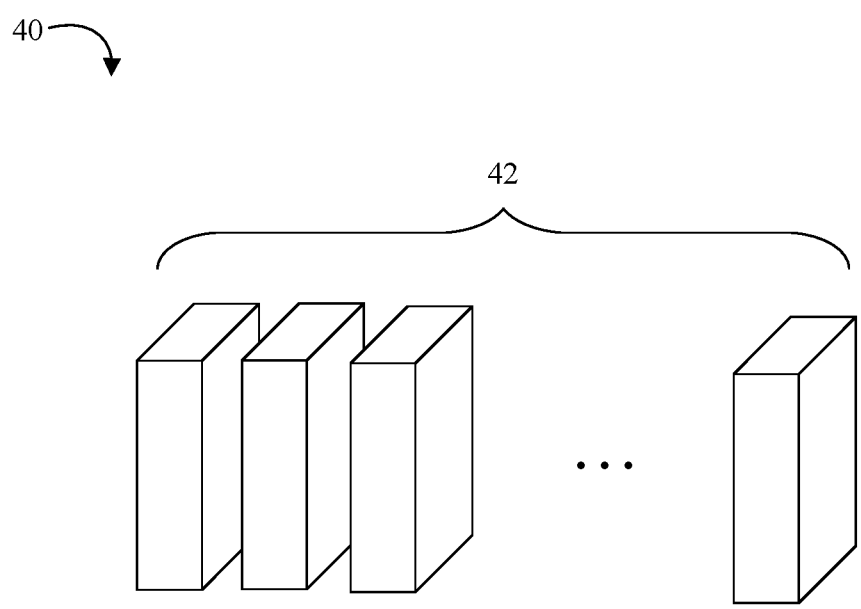
FIG. 4 is a block diagram of an example of deep learning neural network apparatus according to an embodiment.

Turning now to FIG. 4, an embodiment of a DL neural network apparatus 40 may include two or more layers 42. Some embodiments may advantageously provide technology to improve or optimize collective operation overlap in deep learning applications using triggered operations. For example, distributed DL training may require or benefit from multiple "Allreduce" collective operations as part of the backpropagation phase that is used to update model parameters. Typically, one Allreduce operation is performed per layer in the neural network (e.g., each of the layers 42) and the output of the reduction is not utilized until a subsequent training iteration. Thus, the Allreduce operations are non-blocking in nature and multiple such operations can be initiated concurrently and overlapped. For some DL applications, the application must wait for completion of these Allreduce operations in the reverse order (e.g., last-in-first-out (LIFO)) in which they are initiated. The non-blocking aspect of these Allreduce operations may permit overlapping computation and communication in a manner such that both processors and network links are more fully utilized. However, this communication and computation scheduling problem may be challenging and some communication and/or computation resources may be underutilized. Some embodiments may advantageously issue messages/commands with embedded trigger operations to a hardware-based scheduler to improve or optimize Allreduce operation overlap in applications, thereby improving utilization of communication and computation resources.

Collective Allreduce operations are commonly performed in high performance computing (HPC) applications. For example, Allreduce operations may be provided by several industry standard HPC programming models including the Message Passing Interface (MPI) and OpenSHMEM. Non-limiting non-HPC examples of collective operations may include NVIDIA Collective Communications Library (NCCL) and INTEL Machine Learning Scaling Library (MLSL). Some other technology may focus on blocking Allreduce operations or optimizing Allreduce operations for completion in first-in-first-out (FIFO) order. Some other applications may utilize a message-prioritization based scheme to correct for the inversion of completion and issuing order. Each Allreduce operation may consists of many messages. Message prioritization schemes may assign a priority to each message and use a software-based progress engine to complete the operations. A problem with some message prioritization schemes is that software agents must occupy CPUs and run constantly scheduling messages. This reduces the number of CPUs that can participate in the computation, because they are busy scheduling communication. Because DL training is computationally intensive, dedicating CPU cores to communication can degrade performance. Also, after a message is issued, there is no way to recall it. Accordingly, if a very large message is issued by the software scheduler, and a smaller message arrives with higher priority, the smaller message will get delayed by the very large message, which may increase latencies.

Quality of Service (QoS) levels at the networking level may also be used to prioritize some Allreduce operations over others. However, typical networks may have few such levels, forcing applications to map potentially hundreds of Allreduce operations to only a few QoS levels. In the lossless, high-speed networks required to support distributed DL training, all QoS levels may already be in use, leaving none for differentiated prioritization at the application layer.

Some embodiments may advantageously utilize a Host Fabric Interface (HFI) hardware-based message scheduler to improve or optimize collective operations for DL applications. Any suitable hardware-based scheduler technology may be utilized for various embodiments. An example of suitable hardware-based scheduler technology may include technology compatible with the PORTALS specification (e.g., version 4.1, released April 2017, http://www.cs.sandia.gov/Portals). For example, some embodiments may utilize a combination of an online messaging profile-based optimization technology and a hardware scheduler's triggered operations (e.g., exposed via an industry standard interface such as OpenFabrics Interface (OFI)). Advantageously, in some embodiments no software agent may be needed, thereby freeing all processors for computation purposes. Additionally, some embodiments may issue messages exactly in the priority order desired, and there is no need to recall any message, thereby decreasing communication latency for a DL application.

Generally, communication operations are scheduled to be executed by the HFI immediately upon submission by the application. Triggered communication operations allow the application to specify when the operation should be scheduled to execute through, for example, a threshold counter and a specified threshold value. In an example of a basic technology for a triggered operation, when the value of a threshold counter reaches the specified threshold value, the operation executes. Upon completion of the operation, a separate completion counter may be incremented (e.g., if specified by the application). Triggered operations may be implemented in the HFI by a hardware-based scheduler. An API to access the triggered operations may be exposed via the OFI. Non-limiting examples of triggerable operations include Put, Get, Send, Receive and Counter Increment operations. The triggerable counter increment operation may allow incrementing a counter if another counter is incremented. Such linked counter operation may be particularly useful to allow an application to link multiple disjoint chains of triggered operations, thereby constructing a directed acyclic graph (DAG) of communication operations. For example, collective operations may be expressed as a DAG, and various collective techniques may be expressed as triggered operations. Some embodiments may advantageously organize Allreduce operations as a DAG, and utilize triggered operations to express the DAG. The execution of the DAG may be completely offloaded to the HFI, and the HFI may then manage the execution of the DAG. Advantageously, the host processors may be free for other computation purposes.

For DL training, a neural network may be employed that attempts to learn a model for a given training dataset. When an input is provided to the neural network, an output, such as a label or set of bounding boxes, is generated (e.g., which may be referred to as inference or forward propagation). In the case of supervised training, an oracle (usually human) has already assigned a label. Accordingly, an error function is calculated based upon the difference between the actual and desired outputs, and the parameters assigned to the neurons in the neural network are updated (e.g., which may be referred to as backward propagation). Subsequently, the network attempts to label the next input, calculates the error and updates weights again. This process generally repeats across many iterations to train the neural network. Mechanisms such as Stochastic Gradient Descent (SGD) may also be applied to iteratively estimate the error gradient and update model parameters to minimize the error. Accordingly, the number of iterations to train can often reach millions, depending on the data set, and each iteration may require multiple computationally intense tensor product operations.

In order to speed up the training phase, multiple compute nodes may be employed. The neural network (or model) may be replicated on each node, and the input dataset may be divided amongst the nodes. In each iteration, each node processes a different batch of data. At the end of each iteration, each node has a different set of error gradients that are calculated based on the differences in the predicted label and the label assigned by the oracle. Because the model is replicated on each node, the weight updates need to be applied consistently on each node (e.g., for convergence of the model). One approach that is taken is to average out the gradient across all the nodes using an Allreduce operation. Advantageously, some embodiments may improve or optimize the set of Allreduce operations required for gradient exchange at all layers in a neural network.

The Allreduce operation may be used to average the gradient across nodes in the training application. The weight updates may be calculated and applied layer by layer, but there is no need to accumulate gradient at all layers for the entire model at once. That is, once a layer is processed, the gradient for that layer can be propagated simultaneously with the gradient computation of the next layer. Because the backward propagation of a particular layer has to complete before the forward propagation of that layer for the next iteration, the dependencies of the wait operation on each layer is reversed compared to the order in which the Allreduce operations were issued. In other words, the Allreduce operations may complete with low priority, while assigning higher priority to the Allreduce operation that was issued most recently.

Figure 5:
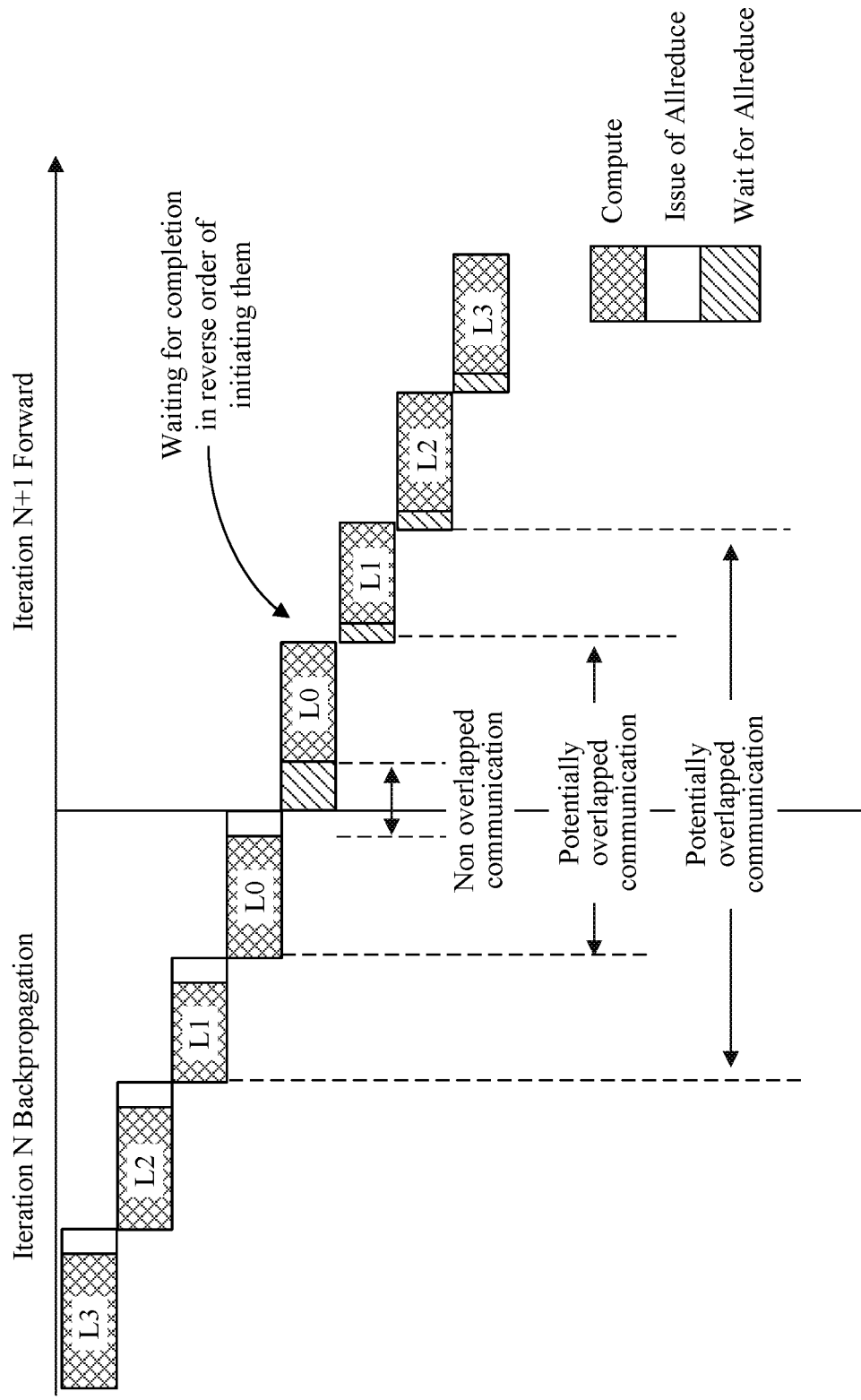
FIG. 5 is an illustrative diagram of execution of layers according to an embodiment.

Turning now to FIG. 5, an illustrative diagram of execution of layers Li (i=0 to 3) shows potentially overlapped communications. During the backward propagation phase while executing a layer Li, for example, some embodiments may overlap execution of the layer Li with the Allreduce messages from a previous layer Li−1, because these layers may have the highest priority (e.g., some embodiments may continue with messages from layer Li−2 and so on once messages from Li−1 have been completed). During the forward propagation phase, messages from the Allreduce operations that were not completed during the backward phase may continue to be sent. Accordingly, during the forward propagation phase, while executing the layer Li, messages from the Allreduce operations in the layer Li+1 from the backward propagation may be sent (e.g., and messages from layer Li+2 may continue and so on once messages from Li+1 have been completed).

In a data parallelism mode, the message sizes of the updated weights, and time for computation of the predicted label at each layer may only be controlled by the number of neurons in the layer. Therefore, after one iteration across all the layers, the message sizes of the Allreduce operation in each layer may be known to the communication subsystem. As previously noted, the entire training might take several million iterations. Some embodiments may advantageously utilize the information from the first iteration to improve or optimize the processing of the following iterations. In particular, it may be difficult or impossible to estimate the message sizes and computation by static analysis of the neural network before the first iteration. Message sizes may be updated potentially at any time desired. The message sizes may also change over time, for example, if the neural network uses techniques like dropout to remove neurons during training. Some embodiments do not rely on a potentially unreliable estimate of the message sizes, but instead provide a practical and programmatic technique to determine the message size information during the first iteration.

Figure 6:
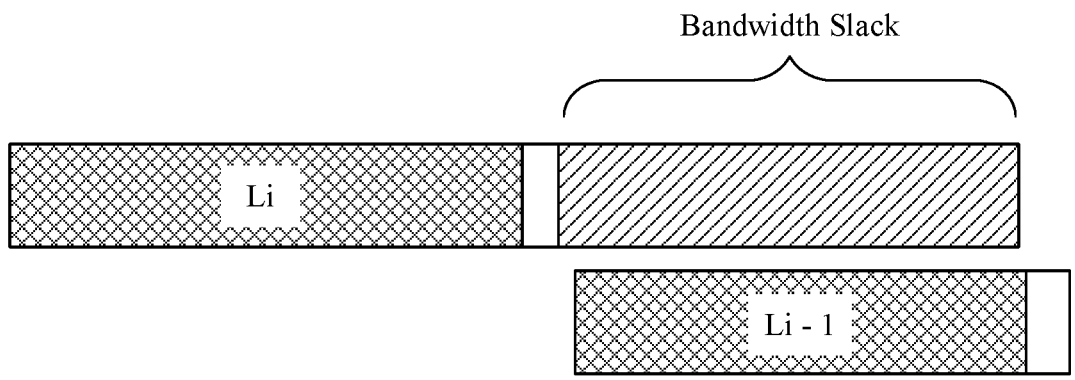
FIG. 6 is an illustrative diagram of an example of a bandwidth slack metric according to an embodiment.

Turning now to FIG. 6, an embodiment of a bandwidth slack metric may be based on potential overlap for collective operations. Given the iterative nature of the machine learning training, after the first iteration, some embodiments of a communication layer may infer the computation time and number of messages per layer. The bandwidth slack may be utilized to identify how many messages can be sent for a particular layer while the next layer is busy computing, and before that layer needs to start communicating. For example, the bandwidth slack metric may be based on the compute bandwidth and the message size as follows:

$$\text{Num messages} = \frac{\text{Time (compute) Bandwidth}}{\text{Message Size}}$$

Once the next layer starts communicating, the messages for the previous layer can be "postponed." Some embodiments may advantageously not waste bandwidth during computation phases, and may also imply the priority of Allreduce operations, with each layer making as much progress as it can before it yields to the next layer.

Figure 7A:
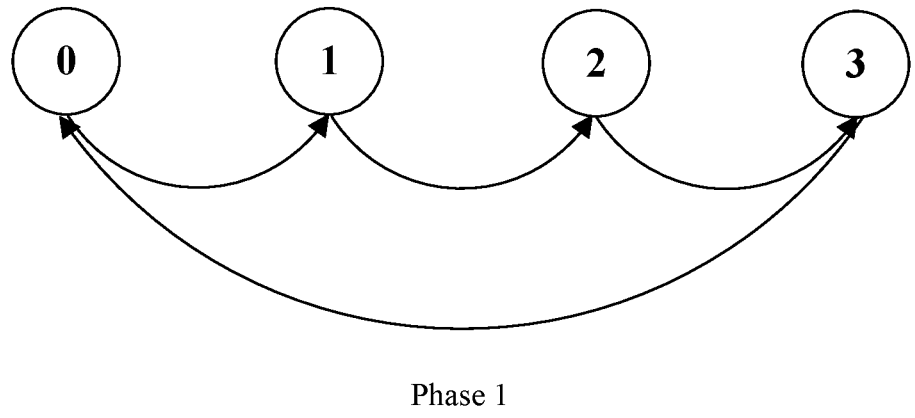
FIGS. 7A to 7B are illustrative diagrams of an example of an Allreduce operation according to an embodiment.
Figure 7B:
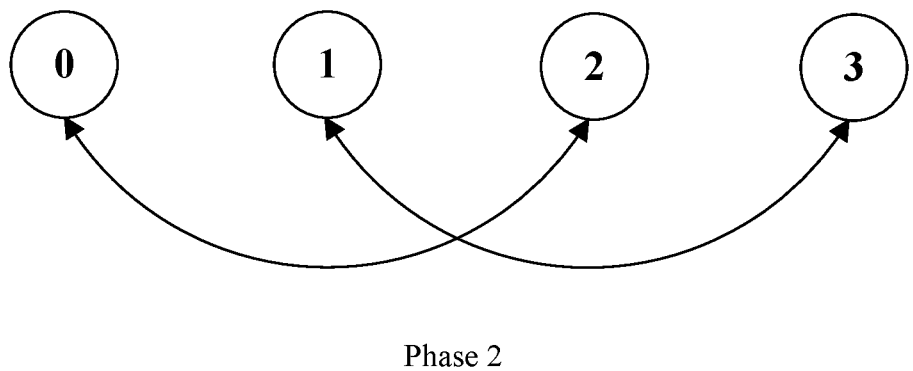

Turning now to FIGS. 7A to 7B, an illustrative diagram of an example Allreduce operation with four processes and two phases may include operations labeled as 0, 1, 2, and 3, with a first phase (Phase 1, FIG. 7A) and a second phase (Phase 2, FIG. 7B). In general, collective operations may include several phases with multiple messages. Some embodiments may attempt to send as many messages as possible for Li in the bandwidth slack, and then yield. For example, some embodiments may determine that two smaller operations fit in a given bandwidth slack, even though one does not immediately precede the other. When Li−1 has finished its own Allreduce operations, it may trigger the restart of any stalled phases of Li. For example, Phase 1 (FIG. 7A) may happen during the slack, but Phase 2 (FIG. 7B) may be postponed.

Turning now to FIGS. 8A to 8B, an embodiment of a communication schedule table 80 may include a row corresponding to each layer of a neural network. Each row of the table 80 may include an entry to identify the layer, the determined compute time associated with the layer, and a list of commands/messages associated with the layer, including triggered operations. Some embodiments may include technology to enable each layer to be able to compute the number of messages in the Allreduce operation that may be issued within the bandwidth slack metric. For example, it may be important that each layer also determines how much computation time the next layer is going to take. The table 80 may be integrated with its associated neural network, or may otherwise be maintained on the training system. The determined compute time associated with the layer (e.g., a "Compute Time" column of the table 80) may indicate the amount of computation required for the layer, and the other entry (e.g., a "Triggered Operations" column of the table 80) may contain the Allreduce schedule expressed as a series of triggered operations. In an initial state of the communication schedule table 80, the Compute Time for each layer may be set arbitrarily high (e.g., infinity), and the Triggered Operations may be unoptimized (see. FIG. 8A). Each triggered operation "Op" may have a particular threshold "Th" and completion counter "C." Each operation does not necessarily have the same completion counter, as this depends on the actual Allreduce technique. For the sake of simplicity, FIGS. 8A and 8B do not distinguish between different completion counters. After the first iteration (e.g., or a subsequent iteration), the Compute Time entries may be updated with respective times T1, T2, T3, etc., and the Triggered Operations entries may also be updated with various schedule optimizations (see. FIG. 8B).

Figure 9:
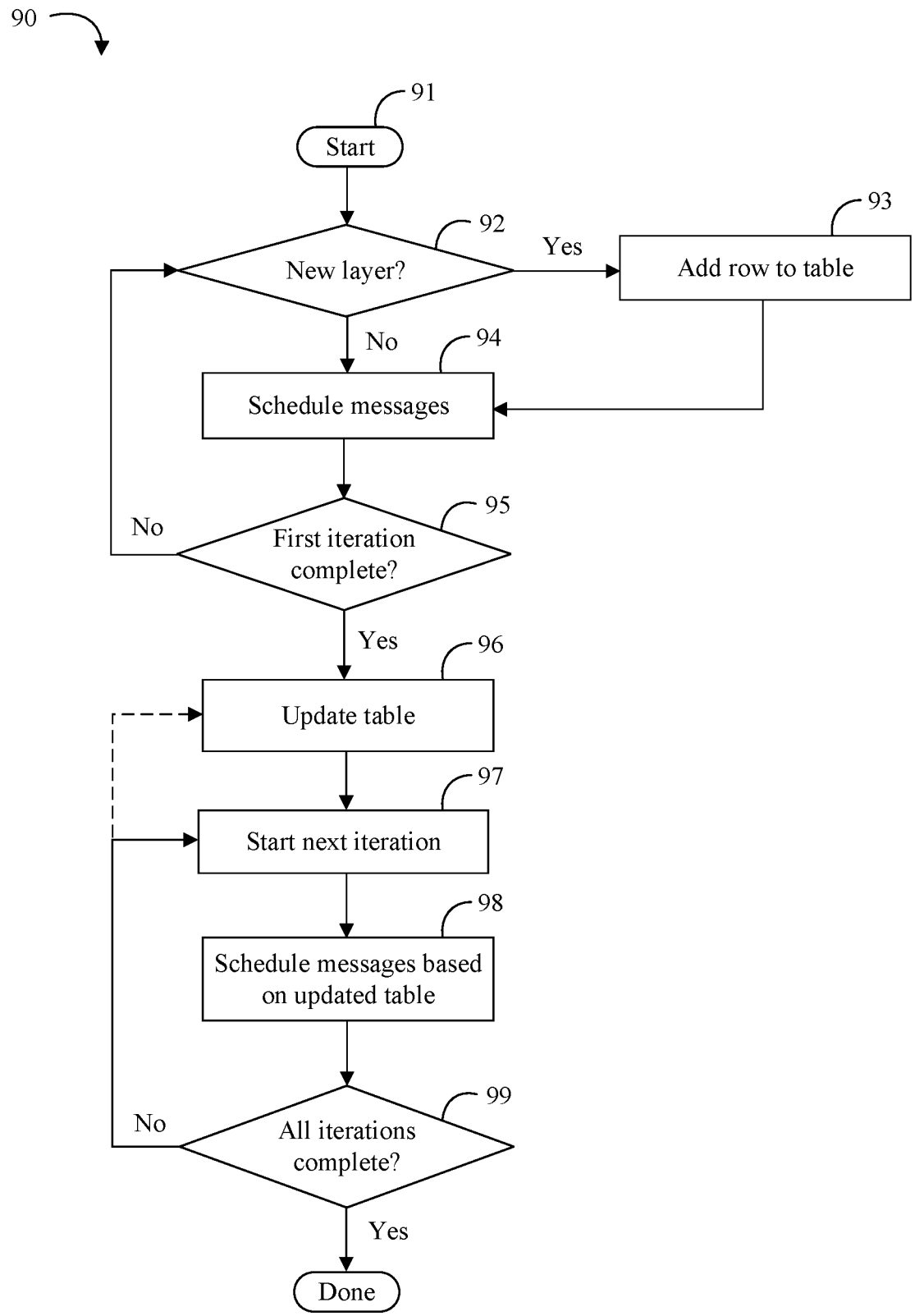
FIG. 9 is a flowchart of an example of a method of scheduling collective operations according to an embodiment.

Turning now to FIG. 9, an embodiment of a method 90 of scheduling collective operations may start at block 91. Prior to the first iteration, the table is initially empty. The method 90 may include determining if a new layer is encountered at block 92 and, if so, adding a row to the table at block 93. For example, a row may be created as each layer is encountered. When a new row is created, each layer may be assumed to take infinite time to execute (e.g., a Compute Time entry in the table is set to an arbitrarily large number or the largest number that can be represented in the table). If a row for the layer already exists in the table at block 92, or after the row is added at block 93, the method 94 may include scheduling messages for the layer at block 94. The communication schedule for the layer may have no prioritization enabled, because the next layer takes infinite time to run, and all messages can be communicated. In reality, the layer will not take infinite time to execute. Therefore, the communication schedule used during the first iteration may be considered unoptimized. Subsequent iterations may be optimized using data gathered during the first iteration. A typical training may run involve millions of iterations. Accordingly, the unoptimized scheduling for the first iteration may be considered as an amortized optimization cost. The method 90 may then include determining if the first iteration is complete at block 95 and, if not, returning to block 92.

When the first iteration is complete at block 95, the method 90 may include updating the table at block 96 for subsequent iterations. For example, after the first training iteration, the Compute Time Ti for each layer Li may be measured and the corresponding table row may be updated to reflect the actual value of computation (e.g., see FIG. 8B). After the times are entered, a schedule optimization may be applied to the Triggered Operations. Any suitable schedule optimization technology may be applied at block 96 to update the table. In general schedule optimization for the subsequent iterations may include pausing a schedule of Li when Li−1 is done with compute, and resuming a schedule of Li when Li−1 is done with communication. An example of a suitable optimization technique may include the method 100 (FIG. 10).

The method 90 may include starting the next iteration at block 97, and scheduling messages based on the updated table at block 98. Advantageously, the second and subsequent iterations may provide improved collective operations overlap by utilizing the information from the first iteration (e.g., as reflected in the updated table). The method 90 may then include determining if all iterations are complete at block 99 and, if not, returning to block 97 to the start the next iteration or, returning to block 96 to update the table. For example, some applications may benefit from fine tuning the information in the table over time. Such fine tuning may be based on any suitable condition (e.g., elapsed time, a number of iterations, a variance between the information in the table and a new measurement, etc.). When all iterations are complete at block 99, the method 90 may be done.

Figure 10:
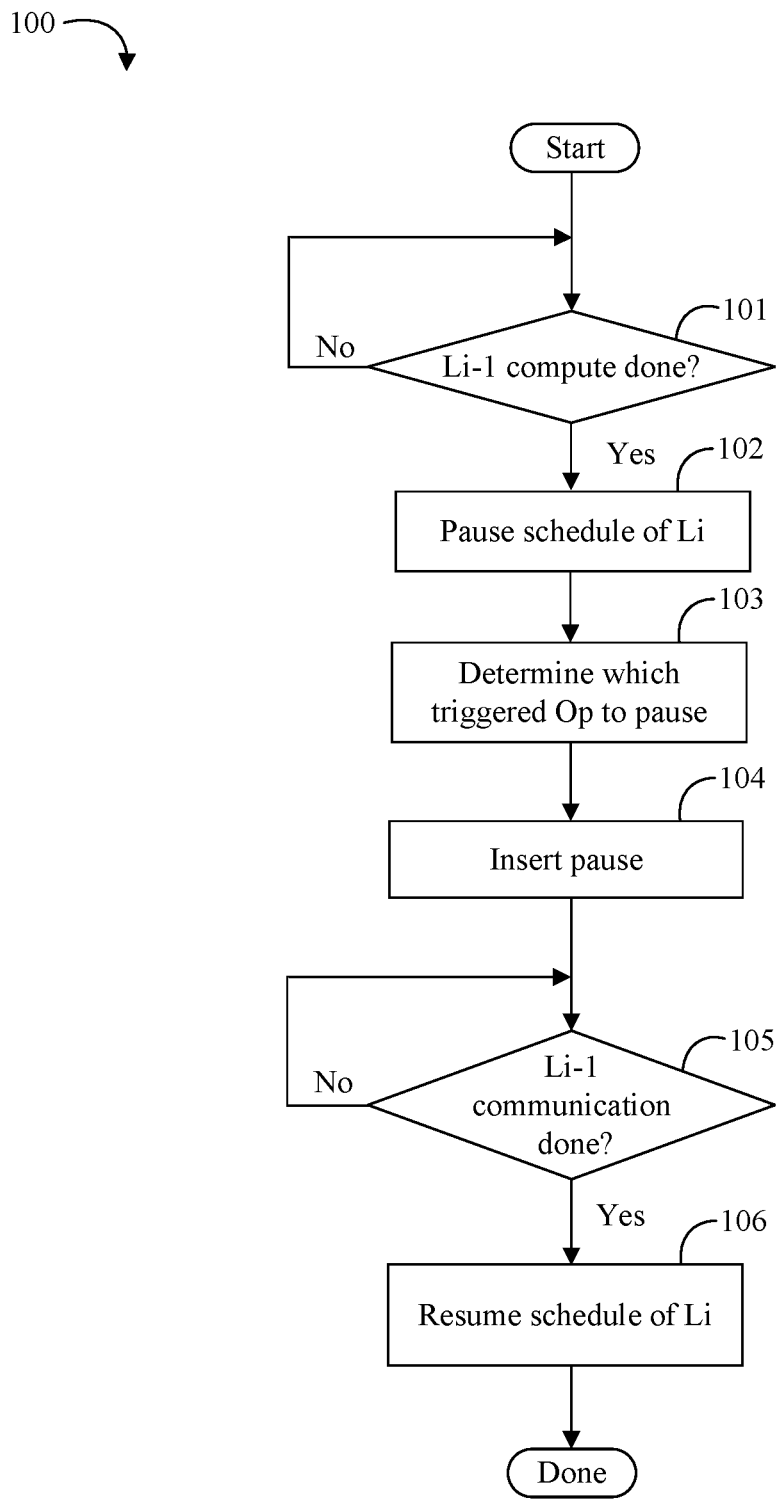
FIG. 10 is a flowchart of an example of a method of updating a schedule according to an embodiment.

Turning now to FIG. 10, an embodiment of a method 100 updating a schedule may include determining if Li−1 is done with compute at block 101 and, if so, pausing a schedule of Li at block 102. The method 100 may then include determining which triggered operation to pause at block 103. For example, the method 100 may include using the bandwidth slack metric and the execution time Ti−1 of layer Li−1 to determine the index of the triggered op to pause based on the amount of data that can be sent/received in Ti, which may given by Ti*Bandwidth. Alternatively, the method 100 may include using the amount of a resource that is available, such as memory or an HFI resource, in conjunction with the amount of that resource required to perform the communication for a given layer to determine the index of the triggered op to pause. Computing this index may involve some processing of the dependences among operations because, for example, a send operation may not be issued until all the receives in other operations have executed. The method 100 may then include inserting a pause at block 104. Normally, for example, the schedule of triggered operations may execute per the dependencies expressed through triggering thresholds. As operations complete, further triggered operations from the schedule may be executed. However, some embodiments may stop the otherwise normal flow of execution of triggered operations to advantageously achieve prioritization across the Allreduce operations for different layers. Some embodiments may accomplish this by increasing the trigger threshold by one (1) for the operations determined to pause in block 103 (e.g., Cx is updated to Cx+1 in the table). After the update, the determined triggered operation is not going to execute automatically as part of the schedule. Rather, the updated triggered operation requires an extra counter increment to remove the pause before it can proceed (e.g., which may be important in resuming the schedule, as described below).

The method 100 may then include determining if Li−1 is done with communication at block 105 and, if so, resuming the schedule of Li at block 106. For example, a special triggered operation such as a triggered counter increment (e.g., TCTInc) may be inserted in the collective operations schedule (e.g., in the Triggered Operations entry in the table, see FIG. 8B). The special triggered operation does not issue a message, but rather simply increments a counter when it fires. For example, FIG. 8B shows how a TCTInc operation may be inserted at the end of the schedule for a particular layer and it may execute after all operations of that schedule are complete. For the sake of simplicity, the threshold counter for the triggered counter increment operation is not shown.

Advantageously, some embodiment may improve or optimize the schedule to prioritize upper layers of the neural network and achieve communication overlap by adding pauses to selectively pause gradient exchange for deeper layers, and then resuming these operations upon completion of upper layers. In some embodiments, the applied optimizations may result in a schedule of Allreduce operations that, when executed, provide a near perfect overlap of the Allreduce operations when waited for in reverse order (e.g., as may be typical for some DL training applications). In some embodiments, the overlap may be further enabled by the advantageous complete offload of triggered operations to a hardware-based scheduler HFI.

Figure 11A:
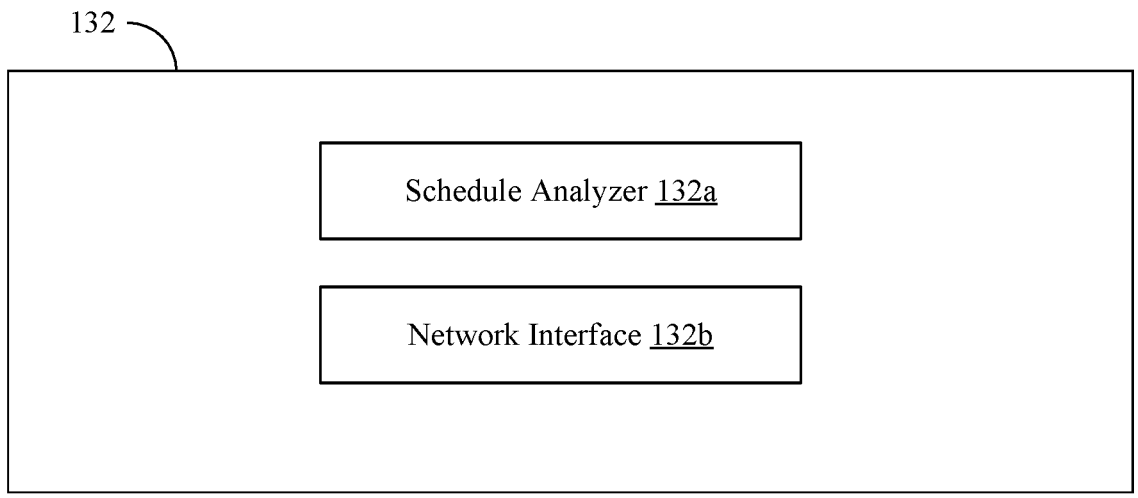
FIGS. 11A and 11B are block diagrams of examples of machine learning apparatuses according to embodiments.

FIG. 11A shows a machine learning apparatus 132 (132a-132b) that may implement one or more aspects of the method 30 (FIG. 3), the method 90 (FIG. 9), and/or the method 100 (FIG. 10). The machine learning apparatus 132, which may include logic instructions, configurable logic, fixed-functionality hardware logic, may be readily substituted for the system 10 (FIG. 1) and/or the apparatus 40 (FIG. 4), already discussed. A schedule analyzer 132a may embed one or more trigger operations in one or more messages related to collective operations for a neural network, and a network interface 132b may issue the one or more messages related to the collective operations to a hardware-based message scheduler in a desired order of execution. In some embodiments, the schedule analyzer 132a may be configured to construct a DAG corresponding to the collective operations for the neural network, and the network interface 132b may be configured to offload execution of the DAG to the hardware-based message scheduler. In some embodiments, the schedule analyzer 132a may be further configured to organize a set of collective operations for gradient exchange based on all layers of the neural network. For example, the schedule analyzer 132a may be configured to overlap messages for a current layer of the neural network with messages of one or more prior layers of the neural network in a backward propagation phase. Additionally, or alternatively, the network interface 132b may be configured to issue messages for a subsequent iteration of collective operations based on information corresponding to a previous iteration of collective operations.

Figure 11B:
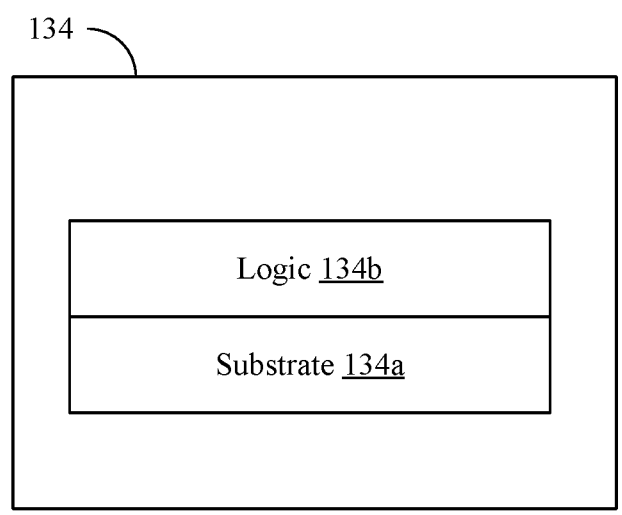

Turning now to FIG. 11B, machine learning apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIG. 3), the method 90 (FIG. 9), and/or the method 100 (FIG. 10). Thus, the logic 134b may embed one or more trigger operations in one or more messages related to collective operations for a neural network, and issue the one or more messages related to the collective operations to a hardware-based message scheduler in a desired order of execution. In some embodiments, the logic 134b may be configured to construct a DAG corresponding to the collective operations for the neural network, and offload execution of the DAG to the hardware-based message scheduler. In some embodiments, the logic 134b may be further configured to organize a set of collective operations for gradient exchange based on all layers of the neural network. For example, the logic 134b may be configured to overlap messages for a current layer of the neural network with messages of one or more prior layers of the neural network in a backward propagation phase. Additionally, or alternatively, the logic 134b may be configured to issue messages for a subsequent iteration of collective operations based on information corresponding to a previous iteration of collective operations. In one example, the apparatus 134 is a semiconductor die, chip and/or package.

Figure 12:
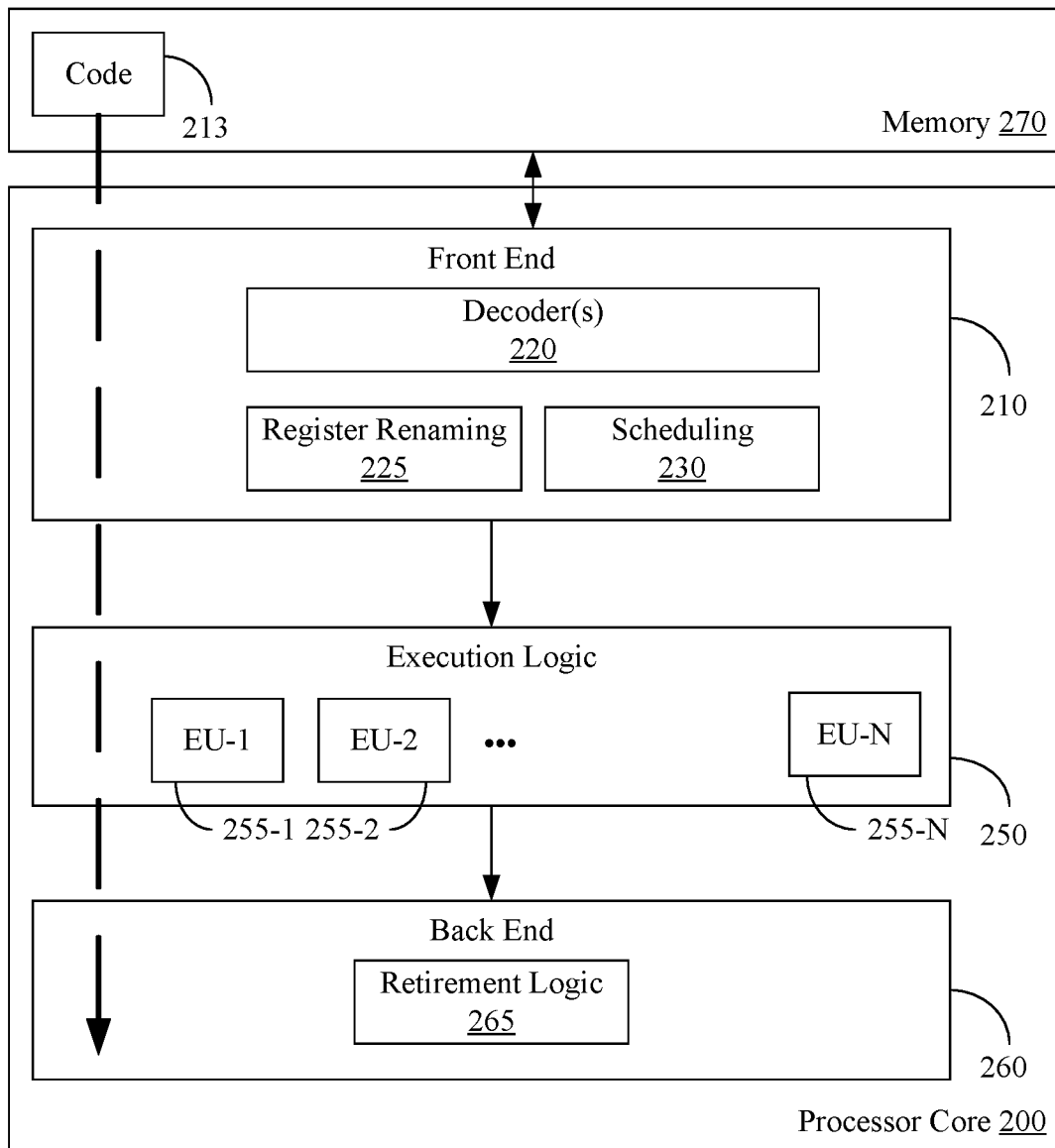
FIG. 12 is a block diagram of an example of a processor according to an embodiment.

FIG. 12 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 12, a processing element may alternatively include more than one of the processor core 200 illustrated in FIG. 12. The processor core 200 may be a single-threaded core or, for at least one embodiment, the processor core 200 may be multithreaded in that it may include more than one hardware thread context (or "logical processor") per core.

FIG. 12 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 3), the method 90 (FIG. 9), and/or the method 100 (FIG. 10), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 12, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 13, shown is a block diagram of a system 1000 embodiment in accordance with an embodiment. Shown in FIG. 13 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 13 may be implemented as a multi-drop bus rather than point-to-point interconnect.

As shown in FIG. 13, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 12.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 13, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 13, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 13, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIG. 3), the method 90 (FIG. 9), and/or the method 100 (FIG. 10), already discussed, and may be similar to the code 213 (FIG. 12), already discussed. Further, an audio I/O 1024 may be coupled to second bus 1020.

Note that other embodiments are contemplated. For example, instead of the point-to-point architecture of FIG. 13, a system may implement a multi-drop bus or another such communication topology.

ADDITIONAL NOTES AND EXAMPLES

Example 1 may include a machine learning system, comprising a neural network, memory communicatively coupled to the neural network, and logic communicatively coupled to the neural network to embed one or more trigger operations in one or more messages related to collective operations for the neural network, and issue the one or more messages related to the collective operations to a hardware-based message scheduler in a desired order of execution.

Example 2 may include the system of Example 1, wherein the logic is further to construct a directed acyclic graph corresponding to the collective operations for the neural network, and offload execution of the directed acyclic graph to the hardware-based message scheduler.

Example 3 may include the system of Example 1, wherein the logic is further to organize a set of collective operations for gradient exchange based on all layers of the neural network.

Example 4 may include the system of Example 3, wherein the logic is further to overlap messages for a current layer of the neural network with messages of one or more prior layers of the neural network in a backward propagation phase.

Example 5 may include the system of Example 1, wherein the logic is further to issue messages for a subsequent iteration of collective operations based on information corresponding to a previous iteration of collective operations.

Example 6 may include the system of any of Examples 1 to 5, wherein the neural network comprises a deep learning neural network.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to embed one or more trigger operations in one or more messages related to collective operations for a neural network, and issue the one or more messages related to the collective operations to a hardware-based message scheduler in a desired order of execution.

Example 8 may include the apparatus of Example 7, wherein the logic is further to construct a directed acyclic graph corresponding to the collective operations for the neural network, and offload execution of the directed acyclic graph to the hardware-based message scheduler.

Example 9 may include the apparatus of Example 7, wherein the logic is further to organize a set of collective operations for gradient exchange based on all layers of the neural network.

Example 10 may include the apparatus of Example 9, wherein the logic is further to overlap messages for a current layer of the neural network with messages of one or more prior layers of the neural network in a backward propagation phase.

Example 11 may include the apparatus of Example 7, wherein the logic is further to issue messages for a subsequent iteration of collective operations based on information corresponding to a previous iteration of collective operations.

Example 12 may include the apparatus of any of Examples 7 to 11, wherein the neural network comprises a deep learning neural network.

Example 13 may include the apparatus of any of Examples 7 to 12, wherein the logic coupled to the one or more substrates includes transistor channel regions that are positioned within the one or more substrates.

Example 14 may include a method of machine learning, comprising embedding one or more trigger operations in one or more messages related to collective operations for a neural network, and issuing the one or more messages related to the collective operations to a hardware-based message scheduler in a desired order of execution.

Example 15 may include the method of Example 14, further comprising constructing a directed acyclic graph corresponding to the collective operations for the neural network, and offloading execution of the directed acyclic graph to the hardware-based message scheduler.

Example 16 may include the method of Example 14, further comprising organizing a set of collective operations for gradient exchange based on all layers of the neural network.

Example 17 may include the method of Example 16, further comprising overlapping messages for a current layer of the neural network with messages of one or more prior layers of the neural network in a backward propagation phase.

Example 18 may include the method of Example 14, further comprising issuing messages for a subsequent iteration of collective operations based on information corresponding to a previous iteration of collective operations.

Example 19 may include the method of any of Examples 14 to 18, wherein the neural network comprises a deep learning neural network.

Example 20 may include at least one computer readable storage medium, comprising a set of instructions, which when executed by a computing device, cause the computing device to embed one or more trigger operations in one or more messages related to collective operations for a neural network, and issue the one or more messages related to the collective operations to a hardware-based message scheduler in a desired order of execution.

Example 21 may include the at least one computer readable storage medium of Example 20, comprising a further set of instructions, which when executed by the computing device, cause the computing device to construct a directed acyclic graph corresponding to the collective operations for the neural network, and offload execution of the directed acyclic graph to the hardware-based message scheduler.

Example 22 may include the at least one computer readable storage medium of Example 20, comprising a further set of instructions, which when executed by the computing device, cause the computing device to organize a set of collective operations for gradient exchange based on all layers of the neural network.

Example 23 may include the at least one computer readable storage medium of Example 22, comprising a further set of instructions, which when executed by the computing device, cause the computing device to overlap messages for a current layer of the neural network with messages of one or more prior layers of the neural network in a backward propagation phase.

Example 24 may include the at least one computer readable storage medium of Example 20, comprising a further set of instructions, which when executed by the computing device, cause the computing device to issue messages for a subsequent iteration of collective operations based on information corresponding to a previous iteration of collective operations.

Example 25 may include the at least one computer readable storage medium of any of Examples 20 to 24, wherein the neural network comprises a deep learning neural network.

Example 26 may include a machine learning apparatus, comprising means for embedding one or more trigger operations in one or more messages related to collective operations for a neural network, and means for issuing the one or more messages related to the collective operations to a hardware-based message scheduler in a desired order of execution.

Example 27 may include the apparatus of Example 26, further comprising means for constructing a directed acyclic graph corresponding to the collective operations for the neural network, and means for offloading execution of the directed acyclic graph to the hardware-based message scheduler.

Example 28 may include the apparatus of Example 26, further comprising means for organizing a set of collective operations for gradient exchange based on all layers of the neural network.

Example 29 may include the apparatus of Example 28, further comprising means for overlapping messages for a current layer of the neural network with messages of one or more prior layers of the neural network in a backward propagation phase.

Example 30 may include the apparatus of Example 26, further comprising means for issuing messages for a subsequent iteration of collective operations based on information corresponding to a previous iteration of collective operations.

Example 31 may include the apparatus of any of Examples 26 to 30, wherein the neural network comprises a deep learning neural network.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A machine learning system, comprising:
memory; and
logic communicatively coupled to the memory and a neural network to:
during a backward propagation phase associated with an iterative process to train the neural network, overlap execution of a first layer of the neural network with transmission of a first message, wherein the first message is associated with a first collective operation associated with a second layer of the neural network; and
during a forward propagation phase associated with the neural network, determine that a second message is to be transmitted based on a previous identification from a previous iteration of the iterative process of a number of messages that are transmittable by a third layer of the neural network during computation of a fourth layer of the neural network, wherein the second message is related to a second collective operation for the neural network, wherein the second collective operation is an operation of the third layer of the neural network that was not completed during the backward propagation phase.

2. The system of claim 1, wherein the logic is further to:
construct a directed acyclic graph corresponding to collective operations for the neural network including the first and second collective operations; and
offload execution of the directed acyclic graph to a hardware-based message scheduler.

3. The system of claim 1, wherein the logic is further to:
organize a set of collective operations for gradient exchange based on all layers of the neural network.

4. The system of claim 3, wherein the logic is further to:
overlap messages for a current layer of the neural network with messages of one or more prior layers of the neural network in the backward propagation phase,
wherein the first collective operation is an Allreduce operation, and
wherein the second collective operation is an Allreduce operation.

5. The system of claim 1, wherein the neural network comprises a deep learning neural network.

6. A semiconductor package apparatus, comprising:
one or more substrates; and
logic coupled to the one or more substrates, wherein the logic is at least partly implemented in one or more of configurable logic or fixed-functionality logic hardware, the logic coupled to the one or more substrates to:
during a backward propagation phase associated with an iterative process to train a neural network, overlap execution of a first layer of the neural network with transmission of a first message, wherein the first message is associated with a first collective operation associated with a second layer of the neural network; and
during a forward propagation phase associated with the neural network, determine that a second message is to be transmitted based on a previous identification from a previous iteration of the iterative process of a number of messages that are transmittable by a third layer of the neural network during computation of a fourth layer of the neural network, wherein the second message is related to a second collective operation for the neural network, wherein the second collective operation is an operation of the third layer of the neural network that was not completed during the backward propagation phase.

7. The apparatus of claim 6, wherein the logic is further to:
construct a directed acyclic graph corresponding to collective operations for the neural network including the first and second collective operations; and
offload execution of the directed acyclic graph to a hardware-based message scheduler.

8. The apparatus of claim 6, wherein the logic is further to:
organize a set of collective operations for gradient exchange based on all layers of the neural network.

9. The apparatus of claim 8, wherein the logic is further to:
overlap messages for a current layer of the neural network with messages of one or more prior layers of the neural network in the backward propagation phase,
wherein the first collective operation is an Allreduce operation, and
wherein the second collective operation is an Allreduce operation.

10. The apparatus of claim 6, wherein the neural network comprises a deep learning neural network.

11. The apparatus of claim 6, wherein the logic coupled to the one or more substrates includes transistor channel regions that are positioned within the one or more substrates.

12. A method of machine learning, comprising:
during a backward propagation phase associated with a training process for training a neural network, overlapping execution of a first layer of the neural network with transmission of a first message, wherein the first message is associated with a first collective operation associated with a second layer of the neural network; and
during a forward propagation phase associated with the neural network, determine that a second message will be transmitted based on a previous identification from a previous iteration of the iterative process of a number of messages that are transmittable by a third layer of the neural network during computation of a fourth layer of the neural network, wherein the second message is related to a second collective operation for the neural network, wherein the second collective operation is an operation of the third layer of the neural network that was not completed during the backward propagation phase.

13. The method of claim 12, further comprising:
constructing a directed acyclic graph corresponding to collective operations for the neural network including the first and second collective operations; and
offloading execution of the directed acyclic graph to a hardware-based message scheduler.

14. The method of claim 12, further comprising:
organizing a set of collective operations for gradient exchange based on all layers of the neural network.

15. The method of claim 14, further comprising:
overlapping messages for a current layer of the neural network with messages of one or more prior layers of the neural network in the backward propagation phase,
wherein the first collective operation is an Allreduce operation, and
wherein the second collective operation is an Allreduce operation.

16. The method of claim 12, wherein the neural network comprises a deep learning neural network.

17. At least one non-transitory computer readable storage medium, comprising a set of instructions, which when executed by a computing device, cause the computing device to:
during a backward propagation phase associated with an iterative process to train a neural network, overlap execution of a first layer of the neural network with transmission of a first message, wherein the first message is associated with a first collective operation associated with a second layer of the neural network; and
during a forward propagation phase associated with the neural network, determine that a second message is to be transmitted based on a previous identification from a previous iteration of the iterative process of a number of messages that are transmittable by a third layer of the neural network during computation of a fourth layer of the neural network, wherein the second message is related to a second collective operation for the neural network, wherein the second collective operation is an operation of the third layer of the neural network that was not completed during the backward propagation phase.

18. The at least one non-transitory computer readable storage medium of claim 17, comprising a further set of instructions, which when executed by the computing device, cause the computing device to:
construct a directed acyclic graph corresponding to collective operations for the neural network including the first and second collective operations; and
offload execution of the directed acyclic graph to a hardware-based message scheduler.

19. The at least one non-transitory computer readable storage medium of claim 17, comprising a further set of instructions, which when executed by the computing device, cause the computing device to:
organize a set of collective operations for gradient exchange based on all layers of the neural network.

20. The at least one non-transitory computer readable storage medium of claim 19, comprising a further set of instructions, which when executed by the computing device, cause the computing device to:
overlap messages for a current layer of the neural network with messages of one or more prior layers of the neural network in the backward propagation phase,
wherein the first collective operation is an Allreduce operation, and
wherein the second collective operation is an Allreduce operation.

21. The at least one non-transitory computer readable storage medium of claim 17, wherein the neural network comprises a deep learning neural network.

* * * * *